(12) United States Patent
Liu et al.

(10) Patent No.: US 11,012,119 B2
(45) Date of Patent: May 18, 2021

(54) NFC ARRANGEMENT

(71) Applicant: FESTINA LOTUS, S.A., Madrid (ES)

(72) Inventors: Jian Liu, Malmo (SE); Daniel Nilsson, Malmo (SE)

(73) Assignee: FESTINA LOTUS SA, Madrid (ES)

( * ) Notice: Subject to any disclaimer, the term of this patent is extended or adjusted under 35 U.S.C. 154(b) by 0 days.

(21) Appl. No.: 16/624,605

(22) PCT Filed: Jun. 19, 2018

(86) PCT No.: PCT/SE2018/050647
§ 371 (c)(1),
(2) Date: Dec. 19, 2019

(87) PCT Pub. No.: WO2018/236277
PCT Pub. Date: Dec. 27, 2018

(65) Prior Publication Data
US 2020/0112344 A1    Apr. 9, 2020

(30) Foreign Application Priority Data

Jun. 20, 2017   (SE) .................................... 1750794-8

(51) Int. Cl.
| H04B 5/00 | (2006.01) |
| G06K 19/07 | (2006.01) |
| G06K 19/077 | (2006.01) |

(52) U.S. Cl.
CPC ....... *H04B 5/0037* (2013.01); *G06K 19/0701* (2013.01); *G06K 19/07794* (2013.01); *H04B 5/0081* (2013.01)

(58) Field of Classification Search
CPC .. H04B 5/0037; H04B 5/0025; H04B 5/0062; H04B 5/0081; H04B 5/0031;
(Continued)

(56) References Cited

U.S. PATENT DOCUMENTS 9,209,866 B2 * 12/2015 Ingels .................. H04B 5/0031
9,972,903 B2 *  5/2018 Makita .................. H01Q 1/002
(Continued)

FOREIGN PATENT DOCUMENTS

| JP | 2013175985 | 9/2013 |
| JP | 2015177389 | 10/2015 |

(Continued)

OTHER PUBLICATIONS

International Search Report for PCT/ES2018/50647, dated Aug. 21, 2018.
(Continued)

*Primary Examiner* — Andrew Wendell
(74) *Attorney, Agent, or Firm* — Kutak Rock LLP (57) ABSTRACT

The present invention relates to a near field communication, NFC, arrangement (100) which comprises an antenna (10) and a controller (20), wherein the controller (20) is connected to the antenna (10) for receiving and/or transmitting data and controlling the operation of the NFC arrangement (100). The NFC arrangement (100) further comprises a booster (30) operatively connected to the antenna (10), and an activation circuit (40) connected to the NFC arrangement (100), wherein the activation circuit (40) is configured to detect an electromagnetic field and in response thereto power up and activate the NFC arrangement (100). In one embodiment, the activation circuit (40) is configured to generate said enabling signal by converting said electromagnetic field into said enabling signal.

13 Claims, 4 Drawing Sheets

(58) Field of Classification Search
CPC ...... H04B 1/1615; H04M 1/73; H04W 52/02; G06K 19/0701; G06K 19/07794; G06K 7/10237; G06K 7/10009
See application file for complete search history.

(56) References Cited

U.S. PATENT DOCUMENTS

| | | | |
|---|---|---|---|
| 2007/0018832 A1 | 1/2007 | Beigel et al. | |
| 2007/0096708 A1* | 5/2007 | Takeyama | H02M 3/073 323/283 |
| 2009/0072951 A1* | 3/2009 | Alberth, Jr. | H04B 5/0062 340/10.41 |
| 2009/0115374 A1* | 5/2009 | Noda | H02J 7/34 320/138 |
| 2010/0245153 A1 | 9/2010 | Kuratli | |
| 2014/0159870 A1* | 6/2014 | Caruana | G06K 7/10009 340/10.3 |
| 2015/0245385 A1* | 8/2015 | Nambord | H04B 5/0081 455/41.1 |
| 2016/0188924 A1* | 6/2016 | Tsukamoto | H04B 1/48 455/41.1 |
| 2017/0331524 A1* | 11/2017 | Aranyosi | H04B 5/0075 |
| 2017/0346533 A1* | 11/2017 | Hoelzl | H04B 5/0031 |
| 2018/0013310 A1* | 1/2018 | Moussaoui | H02J 50/90 |
| 2018/0182491 A1* | 6/2018 | Belliveau | A61B 5/14503 |
| 2019/0156994 A1* | 5/2019 | Cox | G06K 19/072 |
| 2019/0342637 A1* | 11/2019 | Halac | A61B 5/6849 |

FOREIGN PATENT DOCUMENTS

| | | |
|---|---|---|
| JP | 2017512336 | 5/2017 |
| WO | 2017062621 A1 | 4/2017 |

OTHER PUBLICATIONS

Written Opinion of the International Searching Authority for PCT/ES2018/050647, dated Aug. 21, 2018.

* cited by examiner

NFC ARRANGEMENT

This is the United States National Stage of Patent Cooperation Treaty Application No. PCT/SE2018/050647 filed Jun. 19, 2018, which claims priority to Swedish Patent Application No. 1750794-8, filed on Jun. 20, 2017, the disclosures of which are incorporated herein by reference in their entireties.

TECHNICAL FIELD

The present invention relates to the field of near field communication, NFC, and in particular to an NFC arrangement and a method for providing an improved NFC arrangement.

BACKGROUND

In 1983 the first patent to be associated with the abbreviation "RFID", radio-frequency identification, was granted and in 1997 an early form of near field communication, NFC, was patented where a device allowed data communication between two units in close proximity. In 2002 the term Near Field Communication was coined and in 2003 NFC was approved as an ISO/IEC standard, and later as an ECMA standard.

In the 1970s the first digital watch was launched. Since then, the development of wristwatches has continued. From, at the beginning, including a simple digital display and maybe also a calculator, up to smartwatches that were first launched in the late 1990s. A smartwatch is a computerized wristwatch with functionality that goes beyond timekeeping. As the development moves on, it has been realized that the smartwatches could be used for almost anything.

Despite the fact that both NFC technology and smartwatches have been around for a while, there are still a lot of technical difficulties for bringing the use of the two together.

SUMMARY

There are some restrictions that will affect what a smartwatch can do. For example, the size of the smartwatch will introduce some limitations, it has to be sufficiently small in order to be worn around the wrist. Accordingly, the smartwatch cannot house a large battery for optimal usability in terms of battery life, neither a large NFC antenna to achieve optimal NFC performance and standard compliance. In respect to the above, the inventors of the present invention have realized that there are problems with existing near field communication, NFC, arrangements. There are no NFC arrangements capable of providing a sufficient communication distance and minimum power consumption at the same time, while still small enough to be introduced into a wearable device, such as a smartwatch. The market poses additional requirements on smartwatches, such that they have to be configured in a suitable size and housing material as well as having low power consumption. Furthermore, the communication distance of the NFC enabled device is greatly dependent on the size of the NFC arrangement and properties of the surrounding materials. Accordingly, this introduces limitations to the design possibilities of the final product (the NFC enabled smartwatch or device).

One problem to be solved, or at least mitigated by the teachings of this application, is to make an NFC arrangement with an extended communication distance while still achieve minimum power consumption. This problem is, according to a first aspect, solved by providing an NFC arrangement comprising an antenna and a controller, wherein the controller is connected to the antenna for receiving and/or transmitting data and controlling the operation of the NFC arrangement. The NFC arrangement further comprises a booster operatively connected to the antenna, and an activation circuit connected to the NFC arrangement, wherein the activation circuit is configured to detect an electromagnetic field and in response thereto power up and activate the NFC arrangement. In one embodiment, the activation circuit is configured to generate an enabling signal by converting said electromagnetic field into said enabling signal.

In one embodiment, a power supply component is connected in between the booster and the activation circuit in order to power up the booster as the activation circuit detects an electromagnetic field.

In one embodiment, the activation circuit (40) is configured to transmit the enabling signal to the power supply component (50), whereby the power supply component (50) is configured to power up the booster (30) in response to receiving the enabling signal.

In one embodiment, the activation circuit comprises a rectifier arrangement configured to convert an AC-signal to a DC-signal.

In one embodiment, the NFC arrangement further comprises a matching circuit inserted between the antenna and the booster, wherein the matching circuit is configured to achieve a specific range of antenna impedance.

In one embodiment, the activation circuit is connected to an antenna configured for detecting the electromagnetic field. In one embodiment, the antenna may be a separate field activation antenna. In another embodiment, the antenna is the same antenna as the booster is connected to.

In one embodiment the electromagnetic field is an electromagnetic field emanating from a second NFC arrangement.

In one embodiment, the NFC arrangement is configured to be enclosed within a smartwatch.

The present application further provides a smartwatch comprising an NFC arrangement according to the described embodiments.

The present application also provides a method for activating an antenna arrangement in a NFC arrangement, wherein said method comprises detecting, by an activation circuit, a presence of an electromagnetic field, generating an enabling signal, transmitting the enabling signal from the activation circuit to a power supply component, and activating, by the power supply component in response to receiving the enabling signal, a booster in the NFC arrangement.

In one embodiment, the method further comprises the activation circuit generating the enabling signal by converting the electromagnetic field into the enabling signal. The inventors of the present invention have further realized, after inventive and insightful reasoning, that by constructing an NFC arrangement in a clever way with components that can extend the communication distance together with other components that will not activate these extended distance components until they are actually needed, a smart and small NFC arrangement is provided.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIE DESCRIPTION OF THE DRAWINGS

The NFC arrangement according to the application is described in the following with reference to the accompanying drawings, in which.

DETAILED DESCRIPTION

The enclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Near field communication, NFC, is a set of short-range wireless technologies that enables two electronic devices to establish communication by bringing them within a certain distance of each other. Theoretical working distance with compact standard antennas is up to 20 cm, but practical working distance is usually of about 10 cm or less. NFC offers a low-speed connection with simple setup that can be used to bootstrap more capable wireless connections.

NFC is a method for exchanging information and is based on existing radio-frequency identification (RFID) standards including ISO/IEC 14443 and FeliCa. It is a bidirectional communication protocol that can communicate both in active, powered antenna, and passive, induction powered antenna, modes. The key feature that differentiates NFC from RFID is the possibility of bidirectional transfer of information which allows bidirectional communication between NFC devices.

NFC is used for identification, authentication and tracking. It is used for social networking, for sharing contacts, photos or files and NFC enabled devices can act as electronic identity documents and keycards. NFC enabled devices are further used in contactless payment systems, similar to those used in credit cards and electronic ticket smartcards and allow mobile payment to replace/supplement these systems.

Figure 1:
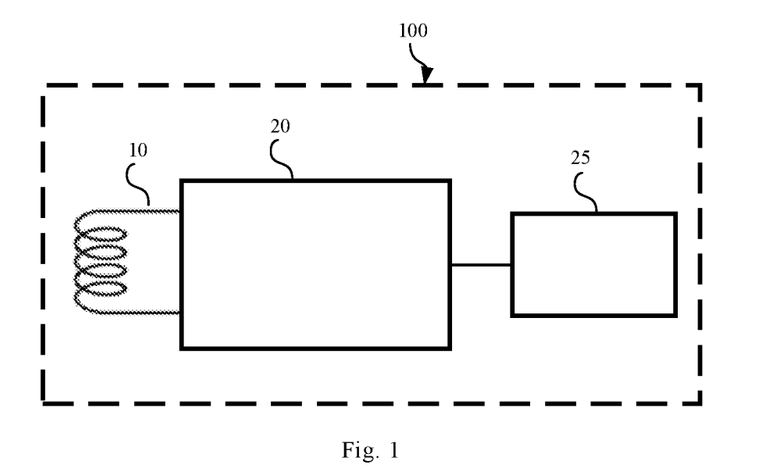
FIG. 1 shows a general NFC arrangement.
Figure 2:
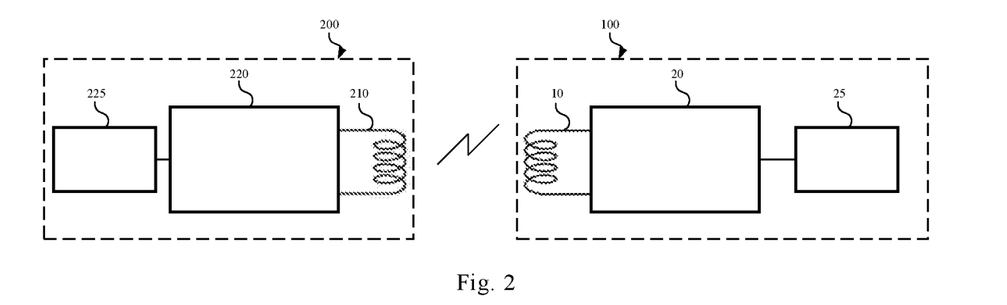
FIG. 2 shows a simplified system where two NFC arrangements communicate with each other.

FIG. 1 shows a general NFC arrangement 100. In order for a device to be NFC enabled, it has to comprise an NFC arrangement 100. The NFC arrangement 100 generally consist of two components; an antenna 10 and a controller 20. FIG. 2 generally shows a system where two NFC arrangements 100, 200 communicate with each other. As seen in the figure, each of the two NFC arrangements 100, 200 consists of at least an antenna 10, 210 and a controller 20, 220. The concept is for a transmitter antenna, in one of the devices, to modulate an electromagnetic field which is measured by means of a receiver antenna in the other device. The NFC arrangement is designed to contain transmission energy within the localized electromagnetic field. This electromagnetic field energy resonates around the communication system, but does not radiate into free space. This type of transmission is referred to as "near-field". The power density of near-field transmissions is extremely restrictive and attenuates or rolls off at a rate proportional to the inverse of the range to the sixth power ($1/r^6$) or −60 dB per decade.

In general, one of the NFC arrangements 100, 200 acts as the initiator and starts the communication, whereas the other NFC arrangement 100, 200 operates in a target mode/listening mode and waits for the initiator. The roles of the NFC arrangements 100, 200, initiator and target, are assigned automatically during the listen-before-task concept which is part of the mode switching of NFC. Commonly, each NFC arrangement acts in target mode. Periodically the arrangement switches into initiator mode in order to scan the environment for NFC targets (=polling) and then falls back into target mode. If the initiator finds a target, an initiation sequence is submitted to establish the communication and then data starts being exchanged.

In a passive mode, the initiator NFC arrangement 100 provides a carrier field and the target NFC arrangement 200 answers by modulating the existing field. In this mode, the target NFC arrangement 200 may draw its operating power from the initiator-provided electromagnetic field, thus making the target NFC arrangement 200 a transponder. In passive communication mode, only one NFC arrangement 100 generates an electromagnetic field, the other NFC arrangement 200 uses load modulation to transfer the data. Passive mode is largely envisioned for use with NFC contactless smartcards and with NFC tags in marketing and user experience applications. A passive NFC arrangement, such as an NFC tag, contains information that other devices can read but does not read any information itself.

In an active mode both initiator and target NFC arrangements 100, 200 communicate by alternately generating their own fields. An NFC arrangement deactivates its electromagnetic field while it is waiting for data. In this mode, both NFC arrangements 100, 200 typically have power supplies. Active mode applications include contactless payment, access control, and bootstrapping other connections. Active NFC arrangements can read information and send it. An active NFC arrangement, like in a smartwatch according to one embodiment of the teachings herein, is not only able to collect information from NFC tags, it is also able to exchange information with other compatible devices and could even alter the information on the NFC tag if authorized to make such changes.

The NFC arrangement 100 according to the teachings herein comprises a controller 20. The controller 20 is configured for receiving and/or transmitting data and controlling the operation of the NFC arrangement 100. A controller is generally a processor or another programmable logic circuit, or a plurality of such processors and/or PLCs assigned to cooperate on performing a task. The task may be specified by computer-readable program instructions stored in a memory 25. The controller is also arranged to interface with a peripheral device. This may be a link between two parts of a device or a controller on an external device that manages the operation of, and connection with, that device. The controller 20 also provides a certain level of order and management by ensuring that the right data ends up in the right place at the right time. The controller 20 in the NFC arrangement 100 connects different elements of the NFC arrangement 100 and acts as a switchboard, enabling data to be sent to and from the NFC enabled device and the outside world.

As mentioned earlier, the other basic part of the NFC arrangement 100 is the antenna 10. An antenna is a kind of interface for transmitting and/or receiving information from one place to another and makes it possible to communicate with another device that is a distance away. In the NFC arrangement 100, the antenna 10 may be a loop antenna. The NFC arrangement 100 employs electromagnetic induction between two loop antennas located within each other's near field, effectively forming an air-core transformer in order to communicate. The field is received by a similar antenna, or coil, in the other NFC enabled device where it is turned back into electrical impulses to communicate data, such as identification number status information or any other information, to the controller 20. The antenna 10 operates within the globally available and unlicensed radio frequency ISM band of 13.56 MHz on ISO/IEC 14443 and ISO/IEC 18000-3 air interface at rates ranging from 106 kbit/s to 424 kbit/s. Most of the electromagnetic energy is concentrated in the allowed ±7 kHz bandwidth range, but the spectral mask for the main lobe is as wide as 1.8 MHz.

A loop antenna is a radio antenna consisting of a loop or coil of wire, tubing, or other electrical conductor with its ends connected to a balanced transmission line. The NFC arrangement 100 uses a small loop, also known as a magnetic loop, the magnetic field strength and pattern generated by such antenna are dependent on the area enclosed by the loop and the number of turns. The number of turns and their layouts play a significant role in achieving the target inductance (1.0-3.0 µH). The loops could have any form, such as rectangular, circular or irregular and accordingly makes the antenna easy to fit in any shaped device. However, the geometry of the antenna is an important factor for achieving a target operating distance. Furthermore, the size of the antenna is of importance for the communication distance. The larger antenna size implies larger operating distance.

Accordingly, with reference to FIG. 2, the NFC arrangement 100 excites a current at 13.56 MHZ through the antenna 10. This induces an electromagnetic field, which further (via mutual coupling) induces an electric current in the antenna 210 of the NFC arrangement 200 when they are placed closely enough. This induced electric current can be read by the controller 220, and accordingly, there is communication.

Figure 3:
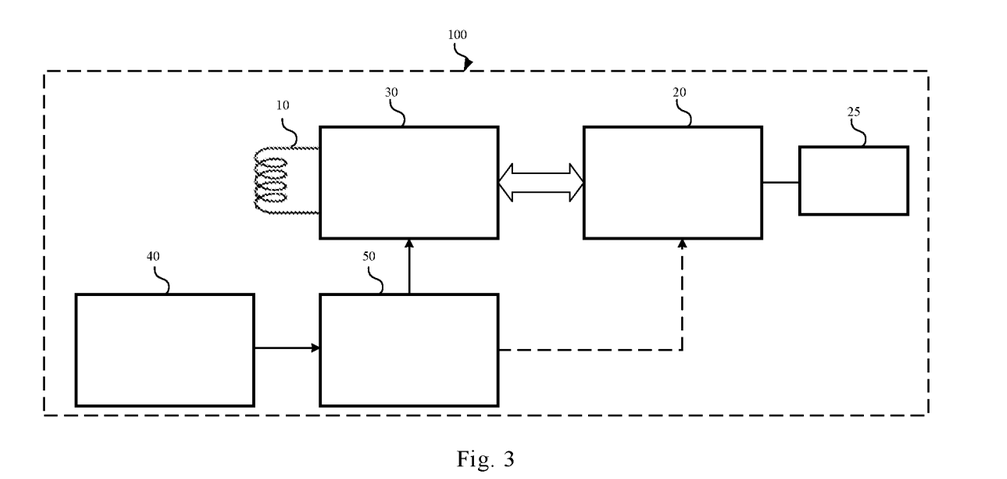
FIG. 3 shows an NFC arrangement according to an embodiment of the invention.

The NFC arrangement 100 according to the teachings herein further comprises a booster 30, as illustrated in FIG. 3. The booster 30 is a hardware interface between the antenna 10 and the controller 20 and is operatively connected to the antenna 10. It listens to the electromagnetic field and is used for amplifying incoming and outgoing signals. Hence, the booster 30 improves the working distance of an NFC enabled device. The booster 30 could be of any known design as long as it is suitable for the NFC arrangement 100 and to be enclosed within an NFC enabled device. The booster 30 is powered by a power supply component 50, such as a DC/DC converter or a load switch.

Accordingly, and as the inventors have realized, by using a booster 30 in the NFC arrangement 100, it is possible to reduce the size of the antenna 10 at cost of high total power consumption, while still achieving a required working distance. This will make it possible to use the NFC arrangement 100 within a device of smaller size, such as for example a smartwatch.

In one embodiment, the teachings herein may be used for implementing a mobile payment or mobile wallet application in a smartwatch. In such an embodiment, the teachings herein enables the NFC arrangement to be used in a smart watch, while still meeting the requirements of communication distance by EMVCo.

EMVCo is a privately owned corporation which defines and manages the EMV (Europay, Mastercard, and Visa) standard. EMV is a global standard for secure and convenient payment using bank cards and the EMV payments infrastructure. EMVCo exists to facilitate worldwide interoperability and acceptance of secure payment transactions. It accomplishes this by managing and evolving the EMV®1 Specifications and related testing processes. This includes, but is not limited to, card and terminal evaluation, security evaluation, and management of interoperability issues.

As would be understood, the teachings herein may also be used in other implementations requiring an NFC arrangement and a power supply of sufficient capacity to be implemented in a small device.

Commonly, a booster is continuously in a working or in a listening mode. When it is not in a working mode, it has to listen in order to receive an initiation protocol from another NFC arrangement. This results in that the booster 30 constantly consumes minimum a dozen of micro-amp (µA) of standby current. Even though the power consumption for a listening mode is significantly lower than the current drawn during an actual working mode, the current consumption during listening takes most power consumption of the entire NFC arrangement 100 considering the average usage time making boosters undesirable for use in smartwatches.

In order to solve the problem with a high power consumption, the inventors have realized that by providing an NFC arrangement 100 according to the teachings herein that further comprises an activation circuit 40, as illustrated in FIG. 3, the NFC arrangement 100 will be enabled and disabled, resulting in a much lower total power consumption.

As can be seen in FIG. 3, the power supply component 50 is connected to the activation circuit 40. The activation circuit 40 is a passive circuitry which is configured to detect an electromagnetic field and convert it into an enable signal. According to the invention, the enable signal will switch on and shut down the power supply component 50, and accordingly, the whole NFC arrangement 100, depending on the existence of a detected magnetic field. This will prevent the booster 30 from constantly consuming power and it will only be activated when it is needed. Furthermore, when there is no NFC communication between the NFC arrangements 100, 200, the activation circuit 40 disables the booster 30, and the NFC arrangement 100 will be powered down.

In one embodiment according to the teachings herein, the NFC arrangement 100 comprises an antenna 10 for transmitting and receiving information to and from another NFC arrangement 200, and a controller 20 for receiving and/or transmitting data and controlling the operation of the NFC arrangement 100. The NFC arrangement 100 further comprises a booster 30 for amplifying the incoming and outgoing signals and an activation circuit 40 which activates the NFC arrangement 100 when an electromagnetic field is detected. The advantages of such an embodiment is that requirements regarding communication distance while performing for example payments are fulfilled. When performing a payment with an NFC arrangement 100, it is important that the distance between the communicating NFC arrangements 100, 200 fulfils an operating volume requirement, with minimum 4 cm reading distance and volume coverage from 3 cm to 5 cm according to posing distance of the NFC enabled device. Furthermore, in the embodiments where the booster 30 is powered by the power supply component 50 and the activation circuit 40, the power consumption is reduced and the need for recharging capabilities could be reduced. For example, in case of no NFC transactions the power saving will be as high as 99%.

In order to power up the NFC arrangement 100 according to the teachings herein, the power supply component 50 is connected between the activation circuit 40 and the booster 30. It receives the enabling signal from the activation circuit 40, which enabling signal the activation circuit 40 has generated by converting the detected electromagnetic field. When the power supply component 50 receives the enabling signal, it activates the NFC arrangement 100 by powering up the booster 30. In one embodiment, the controller 20 is powered through the booster 30 and in another embodiment the controller 20 is powered directly from the same power supply component 50, see the dotted line in FIG. 3. By using the same enabling feature to switch on and off the entire NFC arrangement 100, including the booster 30 and the controller 20, a minimum system power consumption may be achieved.

In one embodiment, the power supply component 50 is a DC/DC converter powered by a battery. A DC/DC converter is an electronic circuit or electromechanical device that converts a source of direct current (DC) from one voltage level to another. It is a type of electric power converter. Power levels range from very low (small batteries) to very high (high-voltage power transmission). When a DC/DC converter is used as a power supply component 50 and when NFC communication is not running, a minimum power consumption which equals a quiescent current of the DC/DC converter may be achieved. Accordingly, by using a DC/DC converter as the power supply component, the inventors have provided a very efficient NFC arrangement 100 with a minimum power consumption.

Figure 4:
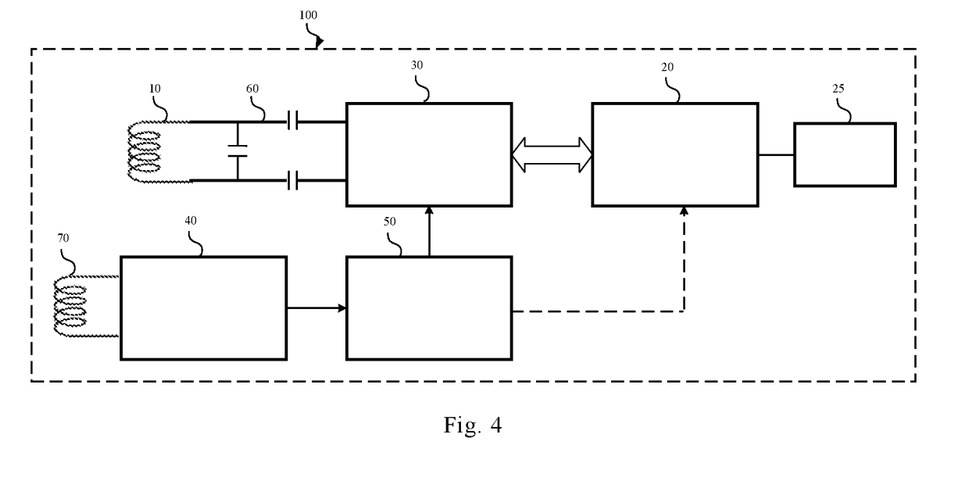
FIG. 4 shows an NFC arrangement with two separate antennas according to an embodiment of the invention.
Figure 5:
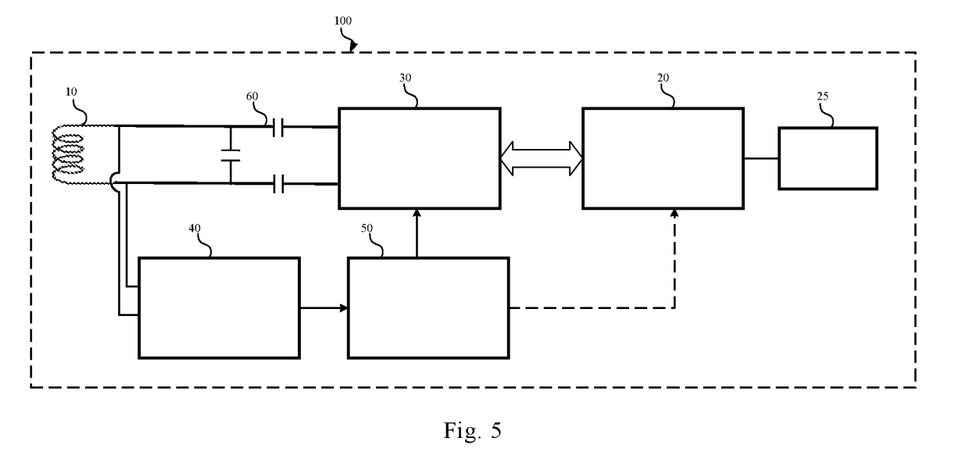
FIG. 5 shows an NFC arrangement where the activation circuit and the booster are connected to the same antenna according to an embodiment of the invention.

The NFC arrangement 100 according to the teachings herein, may further comprise a matching circuit 60, as also illustrated in FIGS. 4 and 5. As the electromagnetic field travels through the different parts of the NFC arrangement 100 it may encounter differences in impedance. Depending on the type of booster 30 a specific range of antenna impedances, inductances and quality factors are required for the best performance in consideration of working distance and power consumption. By minimizing the impedance differences at each interface (antenna matching) the power transfer through each part of the NFC arrangement 100 will be maximized and the attenuation of signal will be minimized. This is obtained by using the matching circuit 60. The matching circuit 60 may consist of discrete capacitors, resistors and inductors, the antenna matching 60 in the figure is only of illustrative purposes. By optimally designing the matching circuit 60, a higher efficiency is achieved.

The activation circuit 40 according to the teachings herein may be connected to an antenna in order to detect whether an electromagnetic field is present or not.

In one embodiment, the activation circuit 40 uses a separate antenna 70, as illustrated in FIG. 4. By using a separate antenna 70 for the activation circuit 40 it is possible to use different designs of the antenna 10 and the antenna 70. Each of the antennas 10, 70 may be designed in an optimal way for their specific purpose. The antenna 10 may be designed with regard to that information should be transmitted and received, while antenna 70 could also be designed with regard to that an electromagnetic field should be efficiently sensed. Accordingly, the use of two separate antennas makes the NFC arrangement 100 very flexible and optimized for the purposes above.

In one embodiment according to the teachings herein, it is feasible to connect the activation circuit 40 to the same antenna 10 as the booster 30 is connected to, as is illustrated in FIG. 5. Accordingly, the antenna 10 will be used for detecting an electromagnetic field. By using the same antenna 10 by both the booster 30 and the activation circuit 40, the NFC arrangement 100 will require less space and could be enclosed within a smaller area since only one antenna is used. This is beneficial when the NFC arrangement 100 is to be enclosed within a very small device and will solve the problem of space consuming components. The attachment of the antenna 10 to the activation circuit 40 may be through direct connection or a pair of switches considering co-existence issues due to different loading and matching requirement of both the booster 30 and the activation circuit 40.

When the booster 30 and the activation circuit 40 is directly connected to the same antenna 10, as illustrated in FIG. 5, the matching circuit 60 for the booster 30 needs to consider the parallel load from both the antenna 10 and the activation circuit 40 in both switched on and off state.

As the inventors have also realized, a rectifier arrangement 80, described in detail below, on the activation circuit 40 side needs to handle higher input power from the booster 30 when transmitting, especially the rectifier diodes should have high enough break-down rating. By considering this, there will be no problem with connecting the booster 30 and the activation circuit to the same antenna 10.

The activation circuit 40, according to one embodiment, comprises a rectifier arrangement 80. A rectifier is an electrical device, which is typically made from a set of cleverly interlocked diodes, and converts alternating current (AC), which periodically reverses direction, to direct current (DC), which flows in only one direction. The process is known as rectification. Since the input signal of the activation circuit 40 is a 13.56 MHz AC-signal coupled from a transmitting NFC arrangement antenna 210 to the receiving NFC arrangement antenna 10, 70, one of the features required for the activation circuit 40 is to convert the AC-signal into DC. Therefore a rectifier circuit 80 is applied. The rectifier circuit 80 could be realized in a number of ways, and is selected in dependence of load requirements. Apart from this, some further considerations are components ratings, forwarding voltage, breakdown voltage, forward current rating, transient current rating, temperature ranges, mounting requirements, etc. By connecting diodes in different configurations different types of rectifiers are obtained.

Figure 6:
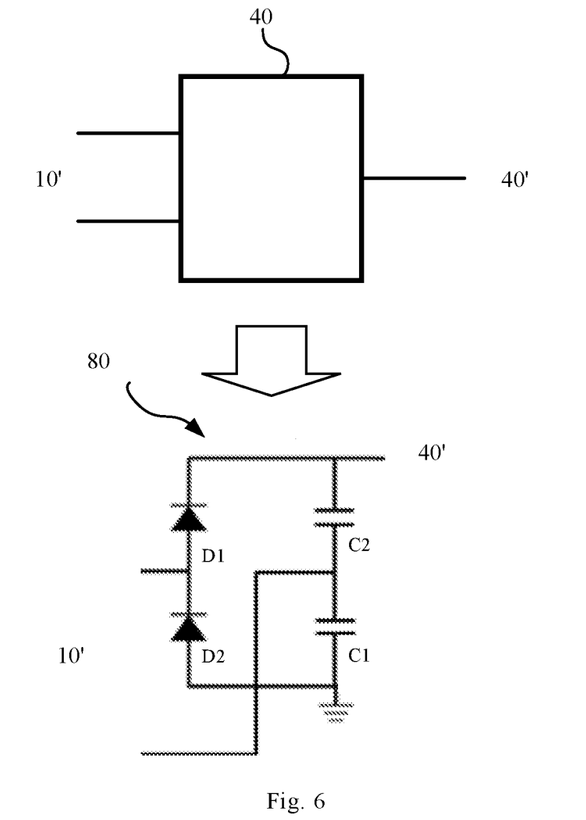
FIG. 6 shows a rectifier arrangement according to an embodiment of the invention.

In one embodiment according to the teachings herein, the rectifier arrangement 80 is realized by a voltage doubler rectifier in bridge topology as is illustrated in FIG. 6. Diodes D1 and D2 are switching elements of the rectifier arrangement 80. They are driven to switch state by the alternating voltage of the input AC signal. C1 and C2 are two identical capacitors for smoothing out the ripples caused by the state switching in the diodes D1 and D2. The bigger capacitance the more stable DC level at the output of the rectifier arrangement 80. However, longer delay will arise due to slower charge and discharge speed of the bigger capacitors. As stated above, the rectifier arrangement 80 could be realized in a number of ways, and is selected in dependence on load requirements and further considerations.

In case the signal level at input of the activation circuit 40 is too low, for example when the antenna 10, 70 of the activation circuit 40 is too small or blocked by high loss material, the conversion scale of rectifier arrangement 80 needs to be increased. A voltage multiplier rectifier could be applied for example. The conversion scale of such solution is more than 1.5 times of the output level from a voltage doubler with the same diodes being used.

Figure 7:
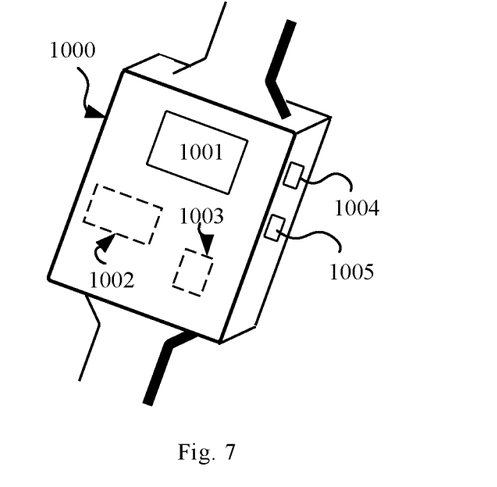
FIG. 7 shows a smartwatch which comprises an NFC arrangement according to an embodiment of the invention.

Since the NFC arrangement 100 according to the teachings herein both is power efficient and small, while still achieving a sufficient communication distance, the NFC arrangement 100 is suitable to be enclosed within a small NFC enabled device. In one embodiment, the NFC arrangement 100 according to the teachings herein is enclosed within a smartwatch 1000, as illustrated in FIG. 7. This is made possible through the use of an NFC arrangement 100 according to the teachings herein as realized and provided by the inventors as such an NFC arrangement 100 is small enough to not affect the design of the smartwatch 1000 and fulfill the requirements placed on smartwatches by the market. An example of such a requirement is that since the smartwatch 1000 is to be worn by a user, it cannot be too large, because then the smartwatch would be too bulky and annoying to the user. Furthermore, since the NFC arrangement 100 still receives the required communication distance, it is suitable for many applications such as payments using NFC technology.

Another advantage with the NFC arrangement 100 according to the teachings herein, is that it is energy efficient and thereby the need for charging capabilities is reduced. An NFC enabled device, such as a smartwatch, with the NFC arrangement 100 enclosed will not increase its power consumption and therefore the need for rechargeable batteries is reduced. Hence, also the need for e.g. bulky charger contacts commonly used when a device needs to recharge often is reduced.

One embodiment of the smartwatch 1000 according to the teachings herein is illustrated in FIG. 7. The smartwatch comprises output device(s) 1001 such as display and/or dial with clock hands and input device(s) 1004, 1005 such as buttons. The smartwatch further comprises a PCB 1002 that carries a controller for controlling the operation of the smartwatch and a radio frequency interface 1003 comprising an NFC arrangement 100 according to the teachings herein for connecting to other devices.

Figure 8:
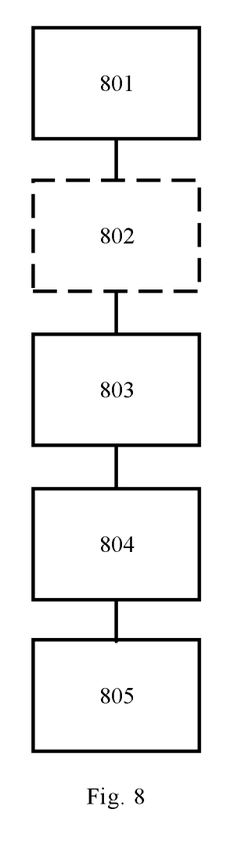
FIG. 8 shows flowchart for a general method of activating an NFC arrangement according to an embodiment of the invention.

The teachings herein also includes a method for activating an NFC arrangement 100. FIG. 8 shows a flowchart for the method. According to the method, an activation circuit 40 detects 801 a presence of an electromagnetic field. When such electromagnetic field is detected, the activation circuit 40 generates 803 an enabling signal. The enabling signal is transmitted 804 from the activation circuit 40 to a power supply component 50. When the enabling signal is received by the power supply component 50, the power supply component 50 powers up 805 a booster 30 in the NFC arrangement 100.

According to one embodiment, the method further comprises that the enabling signal is generated by that the activation circuit 40 converts 802 the electromagnetic field into said enabling signal.

The NFC arrangement 100 and method according to the teachings herein have been described above with reference to a few embodiments. However, as is readily appreciated by a person skilled in the art, other embodiments than the ones disclosed above are equally possible within the scope of the application, as defined by the appended patent claims.

The invention claimed is:

1. A near field communication, NFC, arrangement (100) comprising an antenna (10) and a controller (20), said controller (20) being connected to said antenna (10) for receiving and/or transmitting data and controlling the operation of said NFC arrangement (100), wherein said NFC arrangement (100) is characterized in that the NFC arrangement (100) further comprises:
   a booster (30) operatively connected to the antenna (10), and
   an activation circuit (40) connected to the NFC arrangement (100), wherein the activation circuit (40) is configured to detect an electromagnetic field and in response thereto power up and activate the NFC arrangement (100);
   wherein a power supply component (50) is connected in between the booster (30) and the activation circuit (40) in order to power up the booster (30) as the activation circuit (40) detects the electromagnetic field.

2. The NFC arrangement (100) according to claim 1, wherein said activation circuit (40) is configured to generate an enabling signal by converting said electromagnetic field into said enabling signal.

3. The NFC arrangement (100) according to claim 2, wherein the activation circuit (40) is configured to transmit the enabling signal to a power supply component (50), whereby the power supply component (50) is configured to power up the booster (30) in response to receiving an enabling signal.

4. The NFC arrangement (100) according to claim 1, wherein the activation circuit (40) comprises a rectifier arrangement (80) configured to convert an AC-signal to a DC-signal.

5. The NFC arrangement (100) according to claim 1, further comprising a matching circuit (60) inserted between the antenna (10) and the booster (30) configured to achieve a specific range of antenna impedance.

6. The NFC arrangement (100) according to claim 1, wherein the activation circuit (40) is connected to an antenna (10, 70) configured for detecting the electromagnetic field.

7. The NFC arrangement (100) according to claim 6, wherein the antenna is a separate field activation antenna (70).

8. The NFC arrangement (100) according to claim 6, wherein the antenna is the same antenna (10) as the booster (30) is connected to.

9. The NFC arrangement (100) according to claim 1, wherein the electromagnetic field is an electromagnetic field emanating from a second NFC arrangement (200).

10. The NFC arrangement (100) according to claim 1, wherein the NFC arrangement (100) is configured to be enclosed within a smartwatch (1000).

11. A smartwatch (1000) comprising an NFC arrangement (100) according to claim 1.

12. A method for activating an antenna arrangement in a Near Field Communication, NFC, arrangement (100), said method comprising:
   detecting (801), by an activation circuit (40), a presence of an electromagnetic field;
   generating (803) an enabling signal;
   transmitting (804) said enabling signal from the activation circuit (40) to a power supply component (50); and activating, (805) by said power supply component (50) in response to receiving the enabling signal, a booster (30) in said NFC arrangement (100);

wherein the power supply component (50) is connected in between the booster (30) and the activation circuit (40) in order to power up the booster (30) as the activation circuit (40) detects the presence of the electromagnetic field.

13. The method for activating an antenna arrangement (100) according to claim 12, wherein said method further comprises said activation circuit (40) generating (803) said enabling signal by converting (1102) said electromagnetic field into said enabling signal.

\* \* \* \* \*